United States Patent [19]
Fukuda

[11] Patent Number: 6,062,837
[45] Date of Patent: *May 16, 2000

[54] CENTRAL MECHANISM FOR A TIRE VULCANIZER

[75] Inventor: Hideki Fukuda, Nagasaki, Japan

[73] Assignee: Mitsubishi Jukogyo Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/657,287

[22] Filed: Jun. 4, 1996

[30] Foreign Application Priority Data

Jun. 6, 1995 [JP] Japan ..................................... 7-139399

[51] Int. Cl.[7] .................................................. B29C 35/00
[52] U.S. Cl. .................................. 425/48; 425/52; 425/58
[58] Field of Search ................................. 425/43, 48, 52, 425/58

[56] References Cited

U.S. PATENT DOCUMENTS

| | | | |
|---|---|---|---|
| 3,171,162 | 3/1965 | Soderquist | 425/36 |
| 4,580,959 | 4/1986 | Pizzorno et al. | 425/47 |
| 4,695,234 | 9/1987 | Amano et al. | 425/23 |
| 4,872,822 | 10/1989 | Pizzorno | 425/48 |
| 5,149,545 | 9/1992 | Sakaguchi et al. | 425/35 |
| 5,208,045 | 5/1993 | Siegenthaler | 425/48 |
| 5,223,273 | 6/1993 | Irie et al. | 425/48 |
| 5,409,361 | 4/1995 | Ichikawa et al. | 425/48 |
| 5,522,716 | 6/1996 | Ureshino | 425/48 |

FOREIGN PATENT DOCUMENTS

| | | |
|---|---|---|
| 0270022 | 6/1988 | European Pat. Off. . |
| 0529331 | 3/1993 | European Pat. Off. . |
| 1173366 | 2/1959 | France ..................................... 425/44 |
| 57-167237 | 10/1982 | Japan . |
| 57-167238 | 10/1982 | Japan . |
| 57-170736 | 10/1982 | Japan . |
| 61-49810 | 3/1986 | Japan . |
| 61-197207 | 9/1986 | Japan . |
| 1047511 | 2/1989 | Japan . |
| 8-47928 | 2/1996 | Japan . |

*Primary Examiner*—James P. Mackey

[57] ABSTRACT

In a central mechanism for a tire vulcanizer in accordance with the present invention, after a tire has been vulcanized (a bladder is expanded), a clamp rod is elevated to elevate a lower ring and separate it from a housing. After that, the clamp rod is turned so that a claw of a claw mechanism between the lower ring and the clamp rod can pass through. Then, a pin fixing a post to an upper ring is pulled out, and a bladder assembly is hung and carried out of the vulcanizer to replace the bladder and O-rings. After the bladder and other parts have been replaced, the bladder assembly is hung and mounted to the vulcanizer so that the hole for the claw mechanism of the lower ring is aligned with the upper end of the clamp rod. At this time, when the claw of the claw mechanism passes through, the lower ring is supported by the elevated clamp rod, and the lower ring and a supply/discharge opening of the housing is aligned with each other. After the mounting of the bladder assembly is completed, the pin is inserted in the upper ring and the post by reversing the above procedure to connect them to each other. The clamp rod is turned in the reverse direction to engage the claw of the claw mechanism. Then, the clamp rod is lowered to seat the lower ring on the housing, by which the preparation for vulcanizing tire is completed.

3 Claims, 7 Drawing Sheets

FIG. 8
RELATED ART

CENTRAL MECHANISM FOR A TIRE VULCANIZER

FIELD OF THE INVENTION AND RELATED ART STATEMENT

The present invention relates to a central mechanism for a tire vulcanizer, which uses a both-end open type bladder.

A conventional tire vulcanizer is described with reference to FIG. 6. Reference numeral 50 denotes a bladder, 51 denotes a lower ring, 51a denotes an internally threaded portion provided on the lower inside peripheral surface of the lower ring 51, and 52 denotes a lower bead ring fixed to the lower ring 51. The lower part of the bladder 50 is held by the lower ring 51 and the lower bead ring 52.

Reference numeral 53 denotes a housing, 53a denotes an externally threaded portion provided on the upper outside peripheral surface of the housing 53, and 54 denotes O-ring grooves provided on the aforementioned outside peripheral surface of the housing 53. The externally threaded portion 53a provided on the upper outside peripheral surface of the housing 53 is threadedly engaged with the internally threaded portion 51a provided on the lower inside peripheral surface of the lower ring 51, so that the housing 53 is detachably fixed to the lower ring 51.

A post 55 is provided in the housing 53 in such a manner as to be capable of moving vertically. At the upper part of the post 55 are provided an upper ring (not shown) for holding the upper part of the bladder 50 and an upper clamp ring (not shown). The upper ring and the post 55 are bolted to each other, and the lower end of the post 55 is connected to a piston of a fluid pressure cylinder, so that when the fluid pressure cylinder is operated in the extending direction, a bladder assembly (a bladder assembly consisting of the bladder 50, the lower ring 51, the lower bead ring 52, the upper ring, and the upper clamp ring) is elevated.

At this time, the lower ring 51 is rotated about five to six turns together with the bladder 50 by man power so that the lower ring 51 is removed from the housing 53, by which the bladder 50 and the O-rings in the O-ring grooves 54, which are expendables, are replaced.

Figure 6:
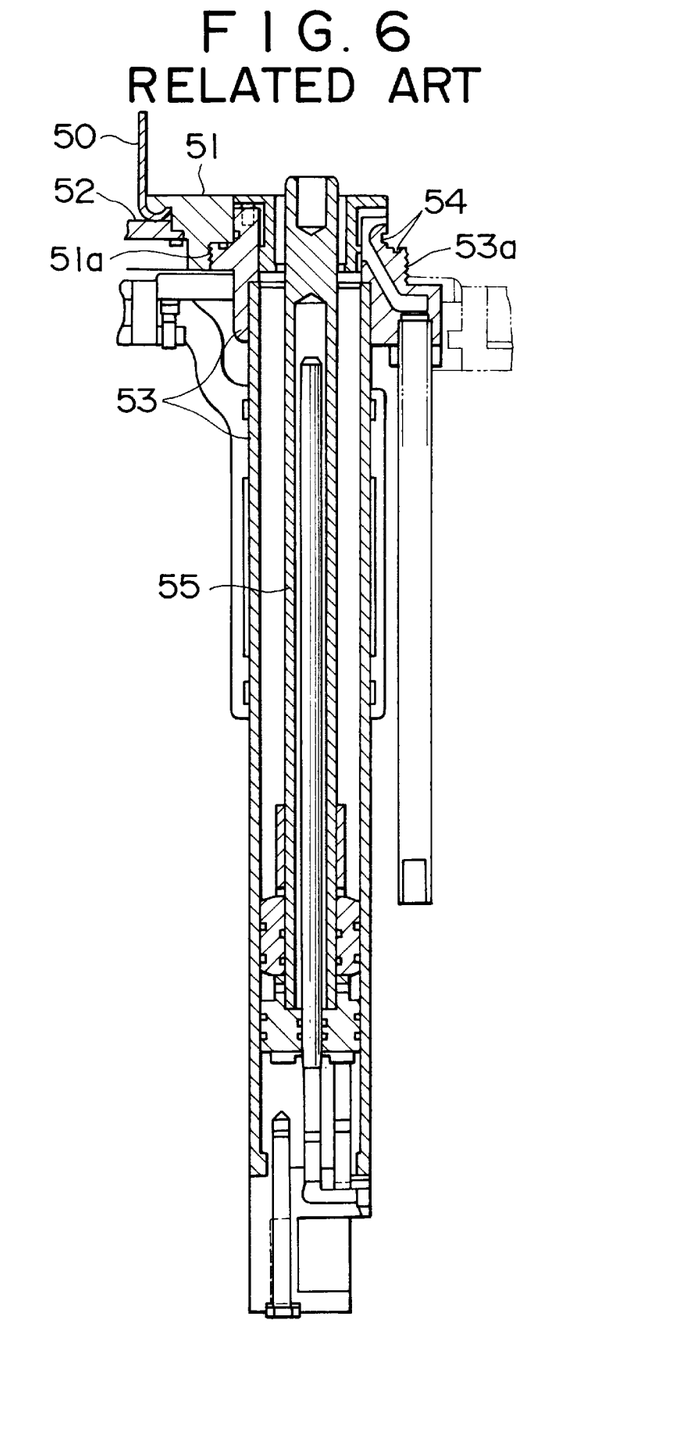
FIG. 6 is a longitudinal side sectional view of a conventional central mechanism for a tire vulcanizer.

On the conventional tire vulcanizer shown in FIG. 6, when the bladder 50 and the O-rings are replaced, an operator must remove the housing 53 by rotating the lower ring 51 about five to six turns together with the bladder 50 in a high-temperature atmosphere. Therefore, not only the replacement of the bladder 50 and O-rings requires much time, but also hard work is forced upon the operator in a high-temperature atmosphere, which imposes an excessive burden on the operator.

Also, since the replacement of the bladder 50 and O-rings requires much time as described above, the productivity is decreased, and radiation loss is increased.

Figure 7:
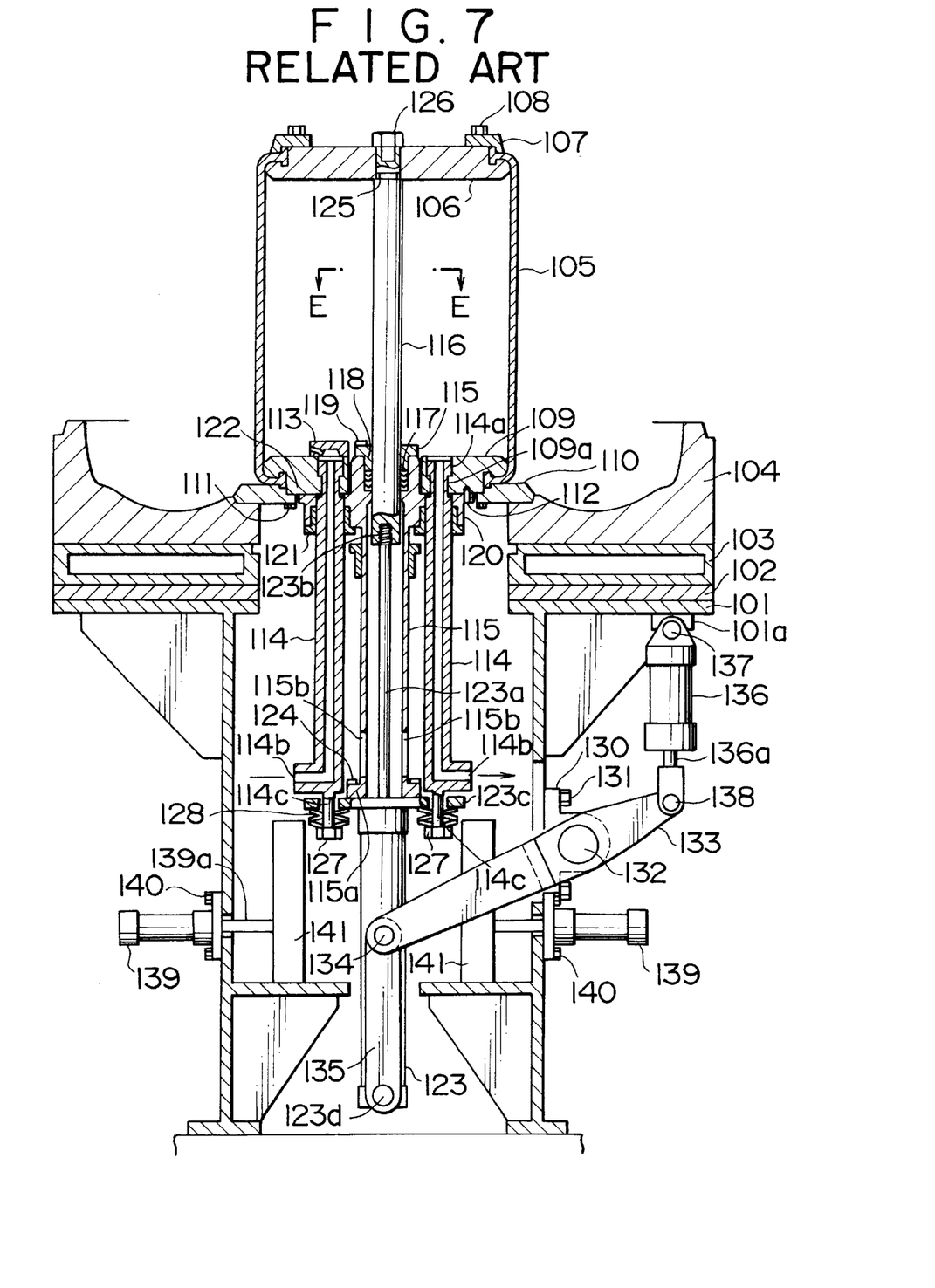
FIG. 7 is a longitudinal side sectional view showing another example of conventional central mechanism for a tire vulcanizer.
Figure 8:
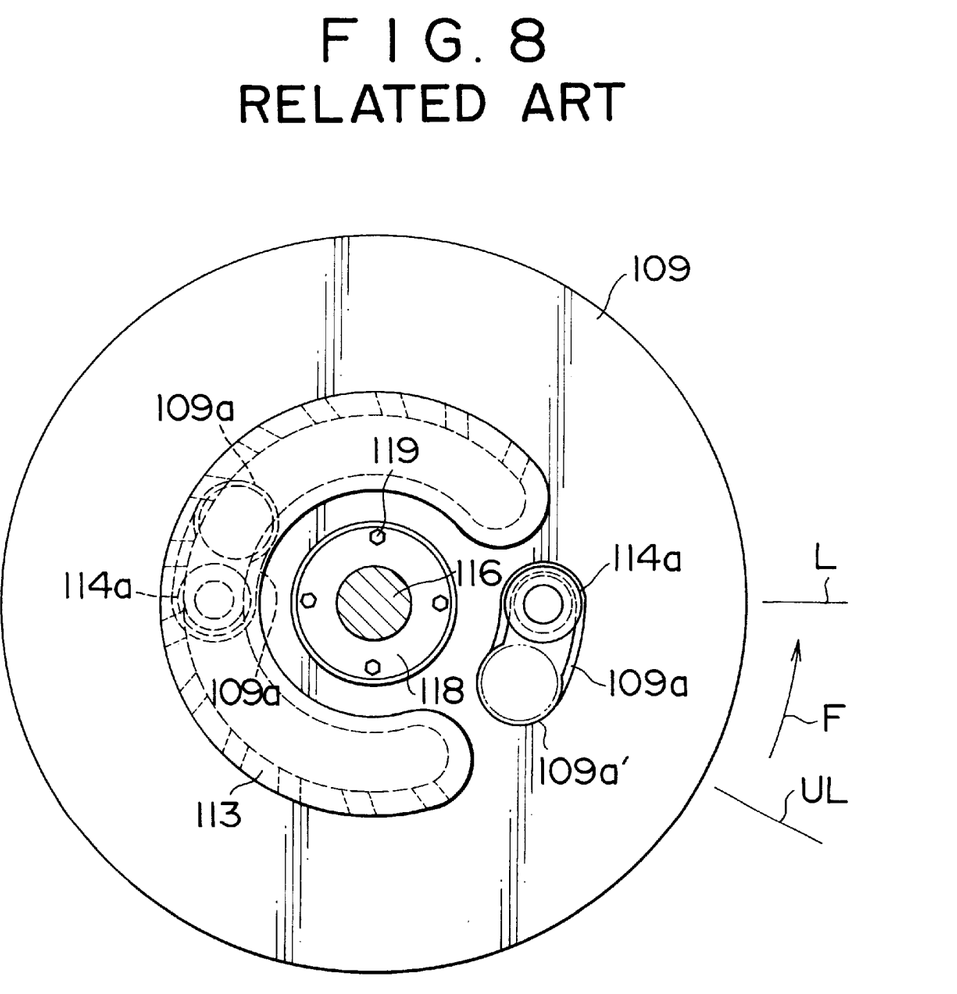
FIG. 8 is a transverse plan view along the line E—E of FIG. 7.

To overcome these problems, the applicant of this invention has already proposed a tire vulcanizer shown in FIGS. 7 and 8 (Japanese Patent Provisional Publication No. 01-047511 (047511/1989)).

With this tire vulcanizer, after the vulcanization of a tire is completed, a piston rod 136a of a fluid pressure cylinder 136 is operated in the extending direction to turn a Y-shaped lever 133 clockwise around a rotation axis 132, by which a lever 135 and a fluid pressure cylinder 123, and a housing 115, a piston rod 123a, a rod 116, a bladder assembly 105 to 113, and each vulcanizing medium inflow/outflow pipe 114 are elevated to separate a lower bead ring 110 of the bladder assembly 105 to 113 from a lower mold 104.

Next, piston rod 139a of a fluid pressure cylinder 139 for each stopper 141 is operated in the extending direction to move each stopper 141 to a position just under each nut 127.

Then, the piston rod 136a of the fluid pressure cylinder 136 is operated in the retracting direction to turn the Y-shaped lever 133 counterclockwise around the rotation axis 132, by which the lever 135 and the fluid pressure cylinder 123, and the housing 115, the piston rod 123a, the rod 116, the bladder assembly 105 to 113, and each vulcanizing medium inflow/outflow pipe 114 are lowered to make each nut 127 abut against each stopper 141.

At this time, the lowering of each vulcanizing medium inflow/outflow pipe 114 and the bladder assembly 105 to 113 ceases, but the lowering of other parts, that is, the lever 135 and the fluid pressure cylinder 123, and the housing 115 and the bladder assembly 105 to 113 continues. Therefore, each belleville spring 128 is pressed by a flange 123c of the fluid pressure cylinder 123, and a head 114a of the vulcanizing medium inflow/outflow pipe 114 is separated from an engagement hole 109a formed in a lower ring 109 of the bladder assembly 105 to 113.

When this state is reached, a bolt 126, which detachably fixes an upper ring 106 of the bladder assembly 105 to 113 to a rod 116, is removed.

Then, the bladder assembly 105 to 113 is rotated in the direction of arrow (F) (counterclockwise) in FIG. 8 in the range of the engagement hole 109a around the center axis of the tire vulcanizer by man power, so that the head 114a of each vulcanizing medium inflow/outflow pipe 114 is positioned at the large-diameter hole portion of the engagement hole 109a. Reference character L in FIG. 8 denotes a lock position, and UL denotes an unlock position.

Next, the bladder assembly 105 to 113 is pulled out upward.

After the old bladder is replaced with a new one, the bladder assembly 105 is mounted by reversing the above procedure, by which the preparation for tire vulcanization is completed.

On this tire vulcanizer, although the amount of rotation is significantly reduced, the lower ring must be rotated together with the bladder. Therefore, the frictional resistance of O-ring, which is inserted between the lower ring and the housing, is high, so that there remains a problem of hard work being forced upon the operator in a high-temperature atmosphere.

OBJECT AND SUMMARY OF THE INVENTION

The present invention was made to solve the above problems. Accordingly, an object of the present invention is to provide a central mechanism for a tire vulcanizer, which can significantly shorten the work time for replacing a bladder, which is an expendable.

To achieve the above object, the present invention provides a central mechanism for a tire vulcanizer, which uses a both-end open type bladder, comprising: a plurality of clamp rods slidably inserted into a housing to the lower part of which a post cylinder for vertically expanding and contracting a bladder assembly is assembled; a claw mechanism for detachably engaging the upper end portion of the clamp rod with the lower ring of the bladder assembly; and driving means for vertically moving and turning the clamp rod.

The central mechanism for a tire vulcanizer in accordance with the present invention, which is constructed as described above, is operated as described below. After a tire has been vulcanized (a bladder is expanded), the clamp rod is elevated to elevate a lower ring and separate it from the housing. After that, the clamp rod is turned so that a claw of the claw mechanism between the lower ring and the clamp rod can pass through. Then, a pin fixing a post to an upper ring is pulled out, and the bladder assembly is hung and carried out of the vulcanizer to replace the bladder and O-rings. After the bladder and other parts have been replaced, the bladder assembly is hung and mounted to the vulcanizer so that the hole for the claw mechanism of the lower ring is aligned with the upper end of the clamp rod. At this time, when the claw of the claw mechanism passes through, the lower ring is supported by the elevated clamp rod, and the lower ring and a supply/discharge opening of the housing is aligned with each other. After the mounting of the bladder assembly is completed, the pin is inserted in the upper ring and the post by reversing the above procedure to connect them to each other. The clamp rod is turned in the reverse direction to engage the claw of the claw mechanism. Then, the clamp rod is lowered to seat the lower ring on the housing, by which the preparation for vulcanizing tire is completed.

In a central mechanism for a tire vulcanizer in accordance with the present invention, after a tire has been vulcanized (a bladder is expanded), the clamp rod is elevated to elevate the lower ring and separate it from the housing. After that, the clamp rod is turned so that the claw of the claw mechanism between the lower ring and the clamp rod can pass through. Then, the pin fixing the post to the upper ring is pulled out, and the bladder assembly is hung and carried out of the vulcanizer to replace the bladder and O-rings. After the bladder and other parts have been replaced, the bladder assembly is hung and mounted to the vulcanizer so that the hole for the claw mechanism of the lower ring is aligned with the upper end of the clamp rod. At this time, when the claw of the claw mechanism passes through, the lower ring is supported by the elevated clamp rod, and the lower ring and a supply/discharge opening of the housing is aligned with each other. After the mounting of the bladder assembly is completed, the pin is inserted in the upper ring and the post by reversing the above procedure to connect them to each other. The clamp rod is turned in the reverse direction to engage the claw of the claw mechanism. Then, the clamp rod is lowered to seat the lower ring on the housing, by which the preparation for vulcanizing tire is completed. Therefore, when the bladder and other parts are replaced, the manual work which must be done by the operator is only the insertion and withdrawal of the pin fixing the post to the upper ring and the attachment and removal of lifting equipment, so that the manual turning work of the lower ring, which has so far been most dangerous and required much time, can be eliminated. Thereupon, the work time for replacing a bladder, which is an expendable, can be shortened significantly.

DETAILED DESCRIPTION OF PREFERRED EMBODIMENTS

Figure 1:
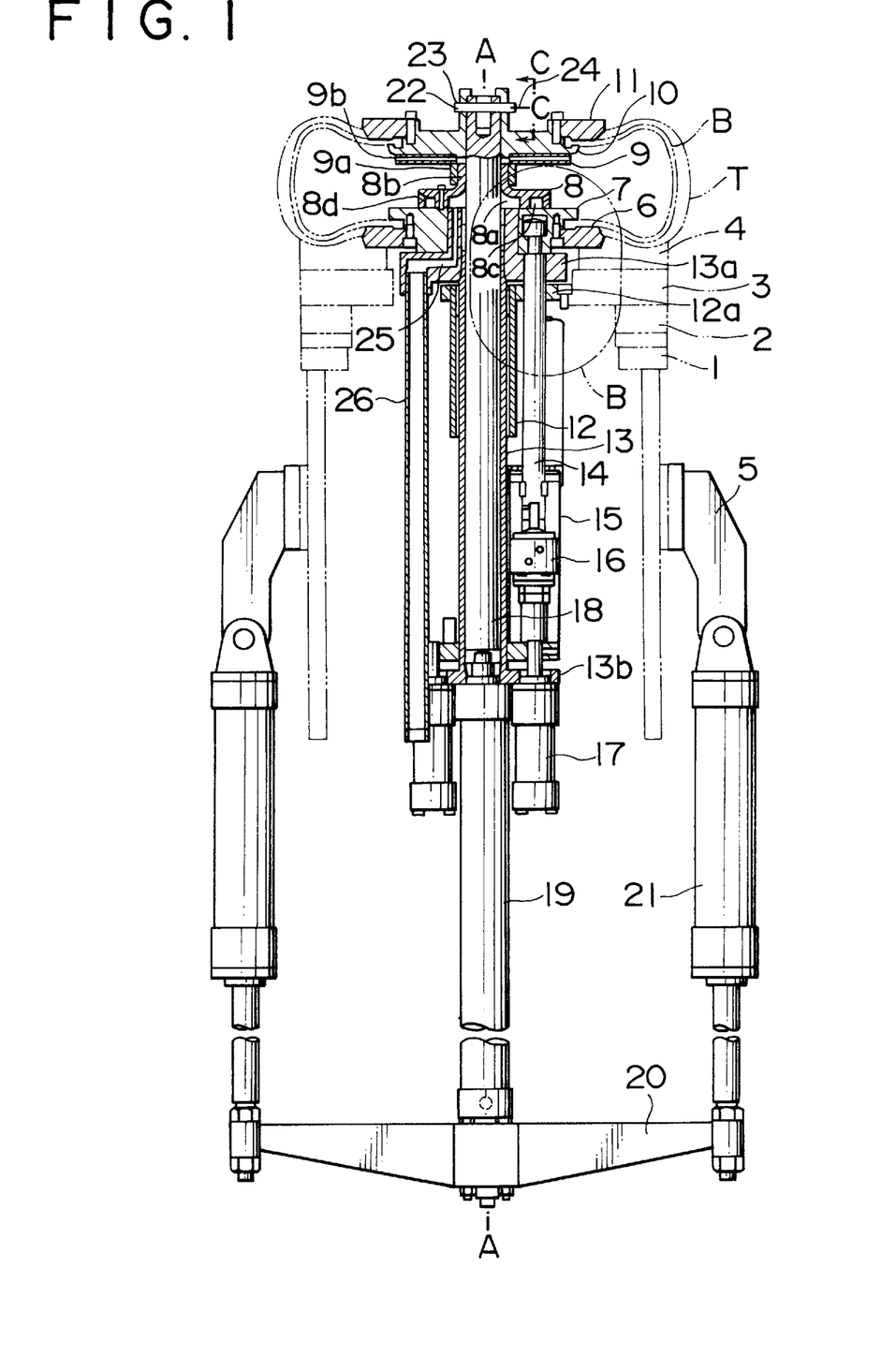
FIG. 1 is a longitudinal side sectional view showing one embodiment of a central mechanism for a tire vulcanizer in accordance with the present invention.
Figure 2:
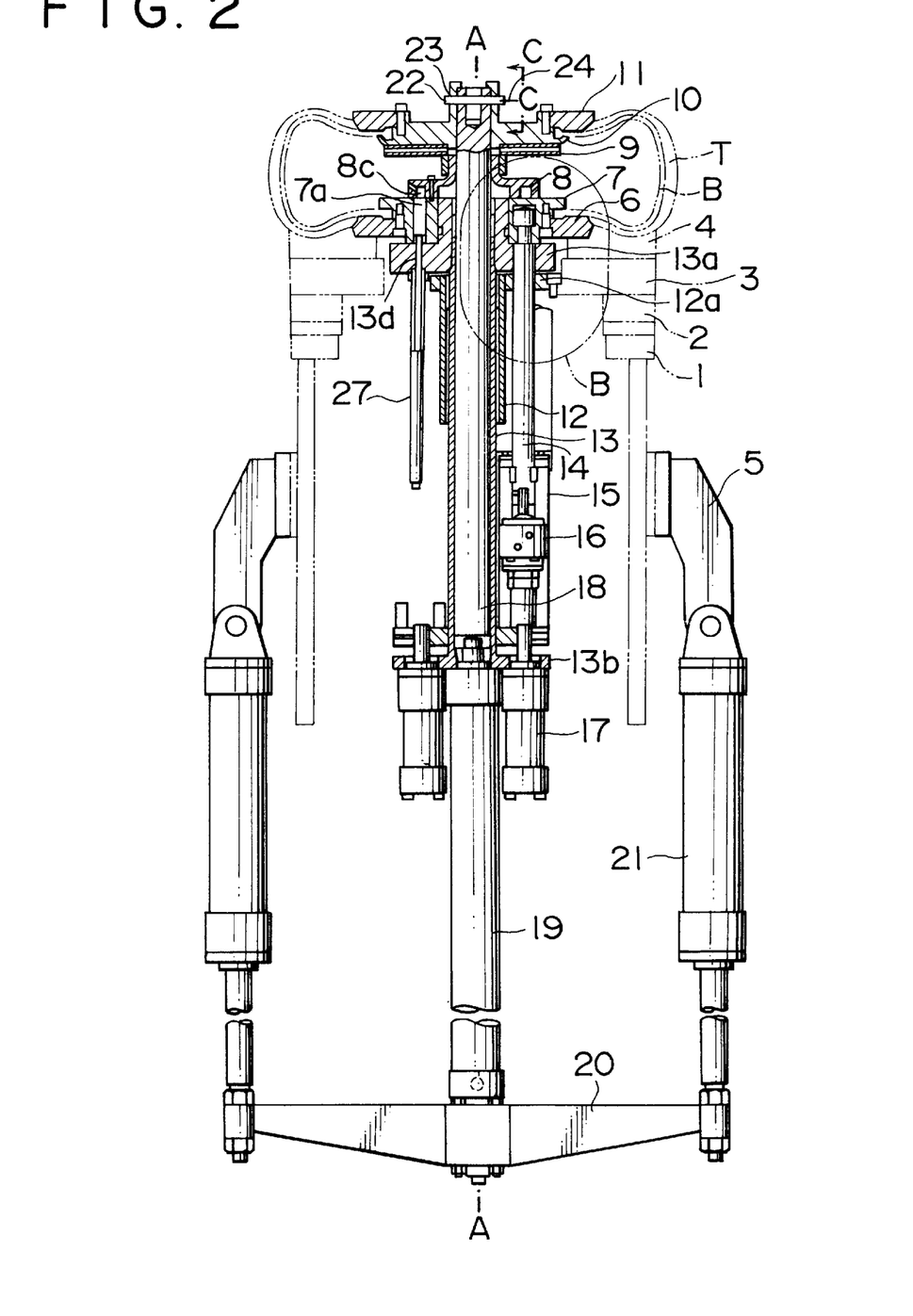
FIG. 2 is a longitudinal side sectional view of the central mechanism for a tire vulcanizer.

A central mechanism for a tire vulcanizer in accordance with the present invention will be described with reference to one embodiment shown in FIGS. 1 to 5. FIGS. 1 and 2 are longitudinal side sectional views taken along the center line A—A of the central mechanism for a tire vulcanizer. In these figures, the members composing the tire vulcanizer, such as an upper mold and a beam for attaching the upper mold, are omitted. The right-hand and left-hand portions of the centerline A—A in FIG. 1 and the left-hand portion of the centerline A—A in FIG. 2 have a different phase.

Reference numeral 1 denotes a base for a tire vulcanizer, 3 denotes a lower platen fixed to the base 1 via a heat insulating plate 2, 4 denotes a lower mold bolted to the lower platen 3, reference character T denotes a tire being vulcanized, and B denotes a bladder.

Reference numeral 7 denotes a lower ring, and 6 denotes a lower bead ring bolted to the lower ring 7. The lower end portion of the bladder B is held by the lower ring 7 and the lower bead ring 6. This lower bead ring 6 can be fitted into a central concave portion of the lower mold 4, forming a part of the tire mold.

Reference numeral 10 denotes an upper ring, and 11 denotes an upper bead ring bolted to the upper ring 10. The upper end portion of the bladder B is held by the upper ring 10 and the upper bead ring 11. This upper bead ring 11 can be fitted into a central concave portion of the upper mold (not shown), forming a part of the tire mold.

The lower ring 7, the lower bead ring 6, the bladder B, the upper ring 10, and the upper bead ring 11 composes a bladder assembly. This bladder assembly is assembled in advance outside the tire vulcanizer and carried into the vulcanizer. In this embodiment, however, a lower nozzle 8 for supplying/discharging a vulcanizing medium (a heating medium and/or a pressurizing medium), described later, is bolted to the lower ring 7, and an upper nozzle 9 to the upper ring 10.

Reference numeral 12 denotes an external cylinder whose flange portion 12a is bolted to the inner peripheral portion of the lower platen 3, and 13 denotes a housing whose central portion is inserted slidably (in such a manner as to be moved vertically) with a bush fixed to the inner periphery of the external cylinder 12 being used as a guide. At the upper end portion of the housing 13, an upper flange 13a is threadedly fixed, and at the lower end portion thereof, an integrated lower flange 13b is provided. A post cylinder 19 is bolted to the lower surface of the lower flange 13b, and a bolted beam 20 is provided at the lower end of the post cylinder 19. A piston rod of bead lift cylinder 21 is fixed to each end of the beam 20. The bead lift cylinder 21 is hung from a bracket 5 bolted to the base 1 via a pin. When the bead lift cylinder 21 is operated, this movement is transmitted to the housing 13 via the post cylinder 19, so that the housing 13 moves vertically.

Reference numeral 18 denotes a post slidably inserted in an inside hole of the housing 13. The lower end of the post 18 is fixed to a piston rod of the post cylinder 19. A publicly known packing is inserted between the post 18 and the upper flange 13a. When the post cylinder 19 is operated, the post 18 is moved vertically.

Figure 3:
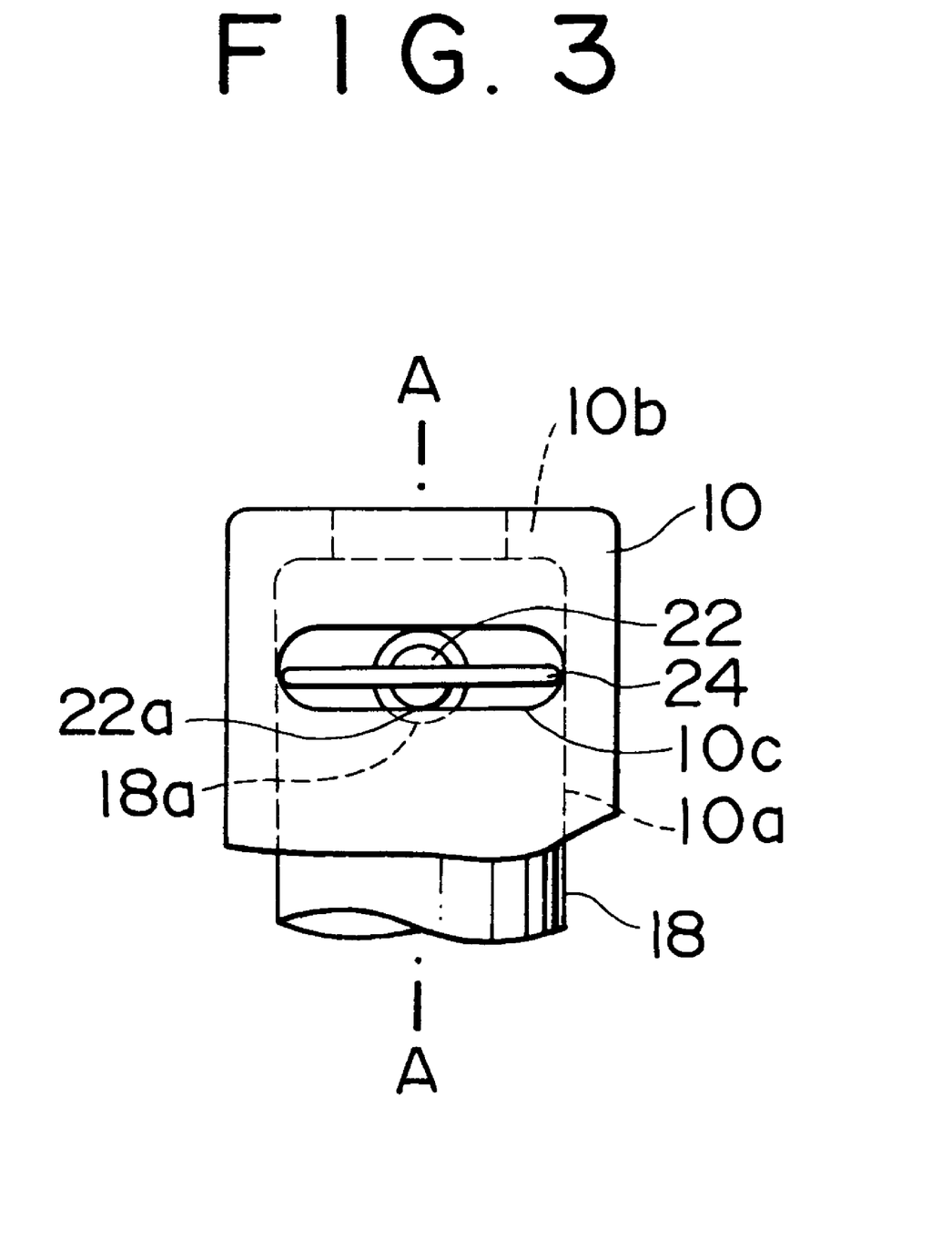
FIG. 3 is a side view along the line C—C of FIGS. 1 and 2.

At the central portion of the upper ring 10, as shown in FIG. 3, a hole 10a into which the upper end portion of the post 18 can be inserted, a convex portion 10b for regulating the insertion length of the upper end portion of the post 18, and a horizontal hole 10c are formed. A pin 22 is inserted into the hole 10c and a horizontal hole 18a formed at the upper end portion of the post 18, and a coming-off preventive C-shaped retaining ring 23 is inserted into the one end portion of the pin 22, by which the post 18 is fixed to the upper ring 10.

For convenience of inserting the pin 22, the hole 10c is formed as an elongated hole extending horizontally, and the lower surface of the pin 22 is formed into a plane shape. A handle ring 24 is inserted into the other end portion of the pin 22 and integrated with the same.

Figure 4:
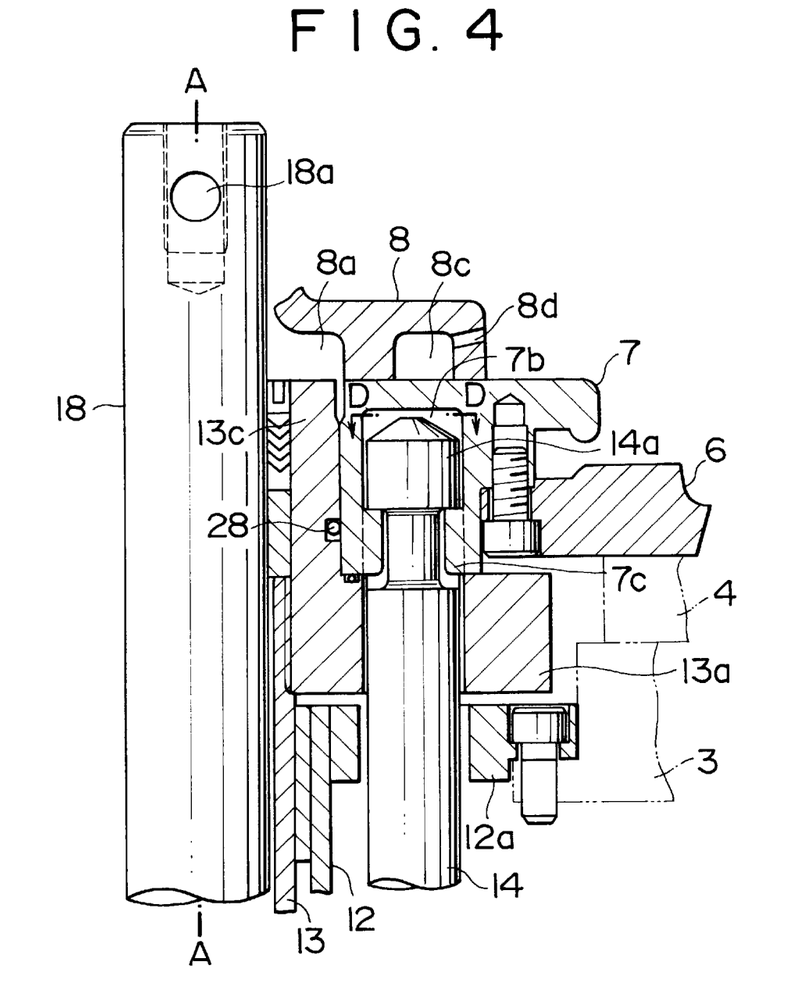
FIG. 4 is an enlarged longitudinal side sectional view of the arrow B portion of FIGS. 1 and 2.
Figure 5:
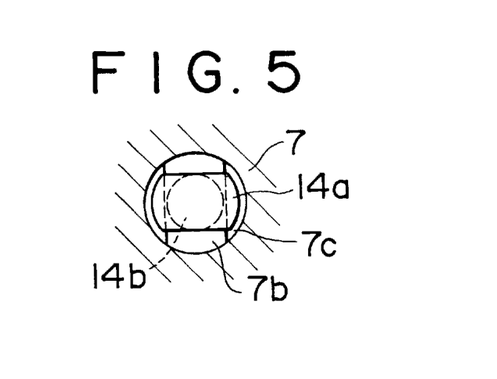
FIG. 5 is a plan view along the line D—D of FIG. 4.

At the central portion of the lower ring 7, as shown in FIGS. 4 and 5, a cylindrical surface, which can accommodate a cylindrical protrusion 13c formed on the upper surface of the upper flange 13a of the housing 13, is formed. On the lower surface side of the lower ring 7 is formed a concave portion 7b into which a T-shaped head 14a formed at the upper end portion of a crank rod 14 is inserted. A plurality of clamp rods 14 are incorporated in the housing so as to be capable of being moved vertically and being turned. At the inlet of the concave portion 7b, protrusions 7c are formed so that the T-shaped head 14a passes or is locked depending on the rotation angle of the clamp rod 14, a claw mechanism being formed by the T-shaped head 14a and the protrusions 7c. Reference numeral 28 denotes an O-ring for sealing the vulcanizing medium.

As illustrated in FIGS. 4 and 5, a distance between the protrusion 7c which is perpendicular to the inlet defines a width of the inlet. The distance parallel to the extent of the protrusions defines a length of the inlet.

To a bracket 15 assembled to the housing 13 so as to be capable of being moved vertically is fixed a piston rod of an elevation cylinder 17 bolted to the lower flange 13b of the housing 13. A rotary cylinder 16 is fixed to the bracket 15, and an output shaft of the rotary cylinder 16 is keyed to the lower end portion of the clamp rod 14 so that the clamp rod 14 is moved vertically and turned by the operation of the cylinders 16 and 17.

The upper nozzle 9 is formed with a plurality of heating medium supply openings 9b which are arranged at predetermined angles radially along the horizontal surface. At the lower surface side cylindrical portion 9a of the upper nozzle 9 is formed a cylindrical surface which can accommodate a cylindrical portion 8b of the lower nozzle 8. When a tire is vulcanized, the cylindrical portion 8b of the lower nozzle 8 is inserted into the lower surface side cylindrical portion 9a, so that a heating medium chamber 8a is formed, and the upper end of a passage 25 formed in the upper flange 13a of the housing 13 is opened. To the other end of the passage 25 is assembled one end of a pipe 26 which is connected to a heating medium source via a switching valve or the like.

The lower nozzle 8 is formed with a plurality of pressurizing medium supply openings 8d which are arranged at predetermined angles radially and at a predetermined angle of inclination with respect to the horizontal plane. The pressurizing medium supply openings 8d are open to a pressurizing medium chamber 8c. The upper end of a passage 7a formed in the lower ring 7 is open to the pressurizing medium chamber 8c. When the lower ring 7 seats on the upper flange 13a, the lower end portion of the passage 7a communicates airtightly with the upper end portion of a passage 13d formed in the upper flange 13a. To the lower end of the passage 13d is assembled one end of a pipe 27 which is connected to a pressurizing medium supply source via a switching valve or the like. Although similar vulcanizing medium discharging means is also provided, the illustration thereof is omitted.

Next, the operation of the central mechanism for a tire vulcanizer, which is shown in FIGS. 1 to 5, will be described in detail.

In order to replace a bladder, the post cylinder 19 is first operated without a tire T to elevate the post 18, by which the bladder B is expanded. Then, the elevation cylinder 17 is operated to slightly elevate the clamp rod 14, by which the lower ring 7 is elevated from the upper flange 13a. Next, the rotary cylinder 16 is operated to turn the clamp rod 14 in such a manner that the T-shaped head 14a passes between the protrusions 7c. After the pin 22 is pulled out, the bladder assembly is hung and carried out of the vulcanizer with the aid of lifting equipment such as a fork lift to replace the bladder B. The O-ring 23, the bead rings 6 and 11 are also replaced as necessary.

After the replacement of the bladder B and other parts is completed, the bladder assembly is hung and mounted on the vulcanizer by reversing the above procedure, and the upper end portion of the post 18 is inserted into the hole 10a in the upper ring 10. The T-shaped head 14a of the clamp rod 14 is inserted into the concave portion 7b of the lower ring 7, and then the pin 22 is inserted to fix the post 18 to the upper ring 10. The rotary cylinder 16 is operated in the reverse direction so that the T-shaped head 14a on top of the clamp rod 14 is locked by the protrusions 7c of the lower ring 7.

At this time, the outside peripheral cylindrical surface of the lower ring 7 and the central cylindrical portion outside peripheral surface of the upper flange 13a are aligned with each other, and the pressurizing medium passage 7a and the passage 13d of the upper flange 13a are aligned with each other, so that the elevation cylinder 17 is operated in the reverse direction to pull down the lower ring 7 so as to seat on the abutting surface of the upper flange 13a, by which the replacement work of the bladder and other parts is completed.

When a tire is vulcanized, the post cylinder 19 and the bead lift cylinders 21 are operated to do work such as the extension of the bladder B and the peeling-off of the vulcanized tire from the lower mold 4 due to the rise in the lower bead ring 6 as in the case with the conventional central mechanism for the tire vulcanizer.

When the upper and lower molds are closed after the shaping is completed, the cylindrical portion 8b of the lower nozzle 8 is inserted into the cylindrical portion 9a of the upper nozzle 9 to form the heating medium chamber 8a, so that the injection of heating medium from the heating medium supply openings 9b into the tire T becomes possible.

I claim:

1. A central mechanism for a tire vulcanizer, which uses a both-end open type bladder, comprising:

a housing;

a plurality of clamp rods slidably inserted into the housing;

a post cylinder for vertically expanding and contracting a bladder assembly located in a lower part of the housing;

a post having a bottom end affixed to the post cylinder;

a claw mechanism for detachable engaging an upper end portion of said clamp rods with a lower ring of said bladder assembly;

an upper ring spaced vertically from the lower ring, said upper ring including means for securing an upper end of said post, said means for securing includes a hole in the upper ring, and a convex portion in the upper ring for regulating an insertion length of the upper end of the post into such hole;

wherein the upper end of the post includes a horizontal hole and the upper ring includes a horizontal hole with a pin located in each horizontal hole.

2. A central mechanism for a tire vulcanizer according to claim 1, wherein said claw mechanism comprises a T-shaped head formed at said upper end portion of each one of said clamp rods; said lower ring having concave portions with protrusions located at an inlet to the concave portions, said T-shaped head at the upper end of each one of said clamp rods passes through the inlet, and is detachably inserted in the concave portion so as to pass or lock said T-shaped head at the upper end portion of each one of said clamp rods in the concave portion depending on a rotation angle of said clamp rods.

3. A central mechanism for a tire vulcanizer according to claim 1, further including driving means for driving the clamp rods comprising a bracket which is assembled to said housing so as to be capable of being moved vertically, an elevation cylinder with a piston rod fixed to said bracket, said piston rod being bolted to a flange of said housing, a rotary cylinder which is fixed to said bracket, the rotary cylinder having an output shaft keyed to a lower end portion of one of said clamp rods.

\* \* \* \* \*